(12) United States Patent
Chakravorty et al.

(10) Patent No.: US 10,812,543 B1
(45) Date of Patent: Oct. 20, 2020

(54) MANAGED DISTRIBUTION OF DATA STREAM CONTENTS

(71) Applicant: Amazon Technologies, Inc., Seattle, WA (US)

(72) Inventors: Sayantan Chakravorty, Sammamish, WA (US); Benjamin Warren Mercier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 15/444,131

(22) Filed: Feb. 27, 2017

(51) Int. Cl.
*G06F 15/16* (2006.01)
*H04L 29/06* (2006.01)
*H04L 29/08* (2006.01)

(52) U.S. Cl.
CPC ........ *H04L 65/4069* (2013.01); *H04L 65/602* (2013.01); *H04L 67/10* (2013.01); *H04L 67/306* (2013.01)

(58) Field of Classification Search
CPC ... H04L 65/4069; H04L 67/306; H04L 67/10; H04L 65/602
USPC ........ 709/219, 203, 223, 228, 231; 707/803, 707/827, 783, 610, 634, 829, 722
See application file for complete search history.

(56) References Cited

U.S. PATENT DOCUMENTS

| | | | |
|---|---|---|---|
| 7,313,613 B1 * | 12/2007 | Brooking | H04L 41/0631 709/220 |
| 7,496,637 B2 | 2/2009 | Han et al. | |
| 8,200,775 B2 | 6/2012 | Moore | |
| 8,639,734 B1 * | 1/2014 | Cook | G06F 16/16 707/829 |
| 9,276,959 B2 | 3/2016 | Theimer et al. | |
| 9,471,585 B1 | 10/2016 | Theimer | |
| 2004/0024846 A1 * | 2/2004 | Randall | H04L 67/26 709/219 |
| 2004/0268244 A1 * | 12/2004 | Levanoni | G06F 16/9574 715/210 |
| 2005/0195425 A1 * | 9/2005 | Bridges | H04N 1/00212 358/1.15 |
| 2005/0289218 A1 * | 12/2005 | Rothman | G06F 3/0605 709/203 |
| 2006/0230021 A1 | 10/2006 | Diab et al. | |
| 2006/0242066 A1 * | 10/2006 | Jogand-Coulomb | G06F 21/10 705/50 |
| 2006/0259462 A1 | 11/2006 | Timmons | |
| 2006/0265518 A1 | 11/2006 | Owens et al. | |
| 2006/0282402 A1 * | 12/2006 | Takahashi | G06F 16/93 |
| 2007/0011665 A1 | 1/2007 | Gandhi et al. | |
| 2007/0022174 A1 | 1/2007 | Issa | |

(Continued)

OTHER PUBLICATIONS

"Amazon Kinesis Streams—Developer Guide", Amazon Web Services, Updated Apr. 19, 2016, pp. 1-136.

(Continued)

*Primary Examiner* — Thuong Nguyen
(74) *Attorney, Agent, or Firm* — Robert C. Kowert; Kowert, Hood, Munyon, Rankin & Goetzel, P.C.

(57) ABSTRACT

Configuration information indicating that one or more stream consumers are granted read-only access to contents of a shared-access data stream is stored at a stream management service. A virtual stream associated with the shared-access stream may be established. In response to a read request directed to the virtual stream, contents of a particular record of the shared-access data stream are provided.

23 Claims, 10 Drawing Sheets

(56) References Cited

U.S. PATENT DOCUMENTS

| | | | |
|---|---|---|---|
| 2007/0094156 A1 | 4/2007 | Isaacs | |
| 2007/0220016 A1 | 9/2007 | Estrada et al. | |
| 2008/0104260 A1* | 5/2008 | Klemba | G06F 17/30017 709/228 |
| 2008/0133767 A1* | 6/2008 | Birrer | H04L 65/4076 709/231 |
| 2008/0168503 A1 | 7/2008 | Sparrell | |
| 2008/0189617 A1* | 8/2008 | Covell | G06F 17/3089 715/738 |
| 2009/0241000 A1* | 9/2009 | Basu | G06Q 30/02 714/748 |
| 2010/0198889 A1* | 8/2010 | Byers | G06F 3/0605 707/827 |
| 2012/0124092 A1* | 5/2012 | Teranishi | G06F 21/604 707/783 |
| 2012/0150796 A1* | 6/2012 | Martick | G06F 17/3048 707/610 |
| 2012/0180109 A1* | 7/2012 | Chen | G06F 17/30035 726/3 |
| 2012/0210083 A1* | 8/2012 | Lawrence | G06F 16/14 711/162 |
| 2013/0145284 A1* | 6/2013 | Anantharaman | H04L 12/1822 715/753 |
| 2013/0290256 A1* | 10/2013 | Barrall | G06F 21/6218 707/634 |
| 2014/0082657 A1* | 3/2014 | McReynolds | G06F 21/10 725/31 |
| 2014/0195516 A1* | 7/2014 | Balakrishnan | G06F 16/168 707/722 |
| 2014/0196079 A1* | 7/2014 | Jannard | H04L 9/0825 725/31 |
| 2014/0380007 A1* | 12/2014 | Suen | G06F 3/0604 711/162 |
| 2015/0295916 A1* | 10/2015 | Sanso | H04L 63/0807 726/9 |
| 2016/0139748 A1* | 5/2016 | Iwaizumi | G06F 3/04883 715/769 |
| 2017/0006314 A1* | 1/2017 | Danovitz | H04L 67/1097 |
| 2017/0214491 A1* | 7/2017 | Maaref | H04L 1/007 |
| 2018/0041571 A1* | 2/2018 | Rogers | G06F 17/30377 |

OTHER PUBLICATIONS

U.S. Appl. No. 14/077,173, filed Nov. 11, 2013, Marvin Michael Theimer et al.
U.S. Appl. No. 14/077,171, filed Nov. 11, 2013, Marvin Michael Theimer et al.
U.S. Appl. No. 14/077,167, filed Nov. 11, 2013, Marvin Michael Theimer et al.
U.S. Appl. No. 14/077,162, filed Nov. 11, 2013, Marvin Michael Theimer et al.
U.S. Appl. No. 14/136,645, filed Dec. 20, 2013, Marvin Michael Theimer et al.

* cited by examiner

MANAGED DISTRIBUTION OF DATA STREAM CONTENTS

BACKGROUND

As the costs of data storage have declined over the years, and as the ability to interconnect various elements of the computing infrastructure has improved, more and more data pertaining to a wide variety of applications can potentially be collected and analyzed. For example, the analysis of data collected by surveillance cameras may be useful in preventing and/or solving crimes, and data collected from sensors embedded at various locations within airplane engines, automobiles, data centers, or complex machinery may be used for various purposes such as preventive maintenance, improving efficiency and lowering costs.

The increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. For example, virtualization technologies may allow a single physical computing machine to be shared among multiple users by providing each user with one or more virtual machines hosted by the single physical computing machine. In addition to computing platforms, some large organizations also provide various types of storage services built using virtualization technologies. Using such storage services, large amounts of data can be stored with desired durability levels.

Despite the availability of virtualized computing and/or storage resources at relatively low cost from various providers, however, the management and orchestration of the collection, storage and processing of large dynamically fluctuating streams of data remains a challenging proposition for a variety of reasons. As more resources are added to a system set up for handling large streams of data, and as more data consumers access the collected data, for example, imbalances in workload between different parts of the system may arise. The failures that naturally tend to occur with increasing frequency as distributed systems grow in size, such as the occasional loss of connectivity and/or hardware failure, may also have to be addressed effectively to prevent costly disruptions of stream data collection, storage or analysis. Distributing respective subsets of a given high velocity data stream to respective geographically dispersed data consumers in a secure, scalable and controlled manner may present non-trivial technical challenges.

Figure 1:
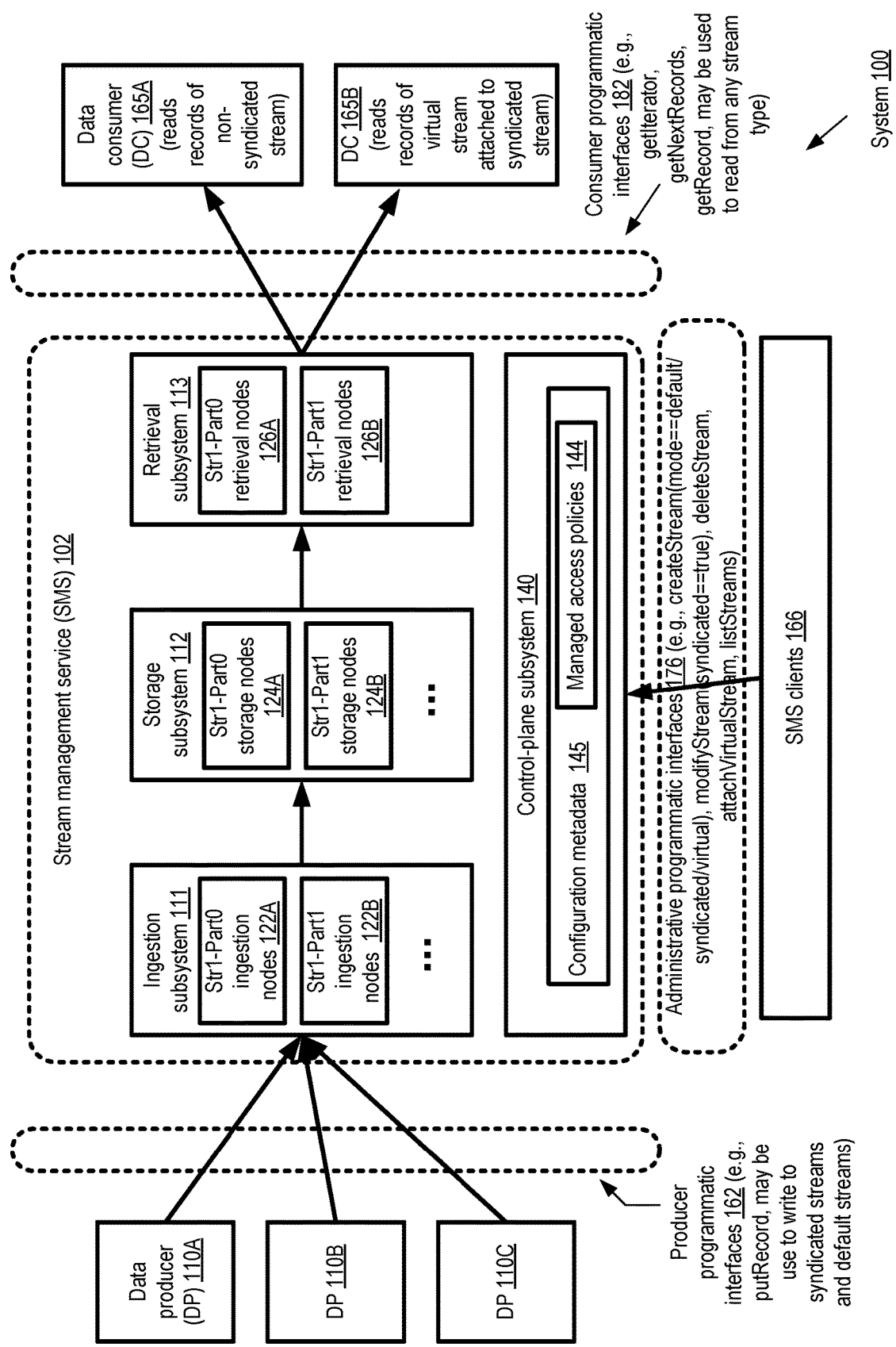
FIG. 1 illustrates an example system environment in which a service for managing several types of data streams, including un-syndicated, syndicated and virtual data streams, may be implemented, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for managing the distribution of streaming data in read-only mode according to access policies approved by stream owners are described. In at least some embodiments, the term "data stream" may be used to refer to a sequence of data records that may be generated by one or more data producers and accessed by one or more data consumers, where each data record is assumed to comprise an immutable sequence of bytes. In various embodiments, a stream management service (SMS) which can be used to store and access data streams may be implemented, for example at a provider network. Networks set up by an entity such as a company or a public sector organization to provide one or more network-accessible services (such as various types of cloud-based computing, storage or analytics services) accessible via the Internet and/or other networks to a distributed set of clients may be termed provider networks in some embodiments. A provider network may sometimes be referred to as a "public cloud" environment. The resources of a provider network and/or a stream management service may in some cases be distributed across multiple data centers, which in turn may be distributed among numerous geographical regions (e.g., with each region corresponding to one or more cities, states or countries).

The stream management service may implement a number of programmatic interfaces (e.g., application programming interfaces (APIs), web pages or web sites, graphical user interfaces, or command-line tools) to enable the creation, configuration and deletion of streams, as well as the submission, storage and retrieval of stream data records in some embodiments. At least in some embodiments, such programmatic interfaces may be used, for example by the owner or creator of a given data stream, to request that the given data stream be configured or designated as a syndicated stream, to which one or more data consumers may be provided read-only access in accordance with an access policy indicated by the requester. Syndicated streams may also be referred to as shared-access streams in some embodiments. The access policy may comprise several elements in some embodiments, including for example information about the identity of the consuming entities (e.g., users, user accounts, groups, or organizations) permitted to read content of the syndicated stream, the manner in which records of the syndicated stream are to be selected and/or transformed for presentation to the consumers, and so on. On behalf of a given consumer permitted to access the contents of the syndicated stream, a virtual stream may be created at the SMS, and the virtual stream may be programmatically attached to the syndicated stream in at least some embodiments. Once a virtual stream has been attached to or associated with a syndicated stream on behalf of a stream consumer, in various embodiments the SMS may be responsible for transmitting at least a portion of the content of various data records of the syndicated stream to the consumer, e.g., according to rules or preferences indicated in the access policy and/or according to preferences indicated by the stream consumer. Respective subsets of the data records of a given syndicated stream may be provided to respective consumers in at least some embodiments—e.g., the data accessible via different virtual streams attached to a single syndicated stream on behalf of respective consumers may differ. The SMS may be responsible for orchestrating the distribution of the content to the subscribing consumers in various embodiments, e.g., by provisioning the appropriate set of resources, ensuring that desired quality of service (QOS) levels are supported for various consumers, monitoring the performance of the read-only accesses, and so on. The time period for which a virtual stream is attached to a given syndicated stream may be referred to in some embodiments as an "attach session" or an "attachment session".

According to at least some embodiments, the SMS may be responsible for performing one or more read-optimizing operations to support targeted levels of performance for consumers of a syndicated data stream. For example, it may sometimes be the case that stream data records accumulate at a very rapid rate, such as hundreds or thousands of records per second obtained from a geographically distributed collection of sensors. As more consumers attach, via respective virtual streams, to a syndicated data stream at which such rapidly-accumulated records are stored and begin accessing the stream's data, some data storage devices (e.g., devices comprising magnetic disks, solid-state devices, and the like) initially provisioned by the stream management service for the syndicated data stream may begin experiencing difficulties handling the aggregate read request rates. In order to provide desired QOS levels for the various consumers, in one embodiment the SMS may initiate a read-optimizing operation in which at least a portion of the stream's data records are replicated to multiple storage devices, e.g., beyond the minimum number of storage devices that may have been provisioned to meet the availability and/or data durability targets for the syndicated stream. When a read request is received from an authorized consumer of a syndicated stream, in such an embodiment a particular storage device at which the requested data records are replicated may be used to provide the response. In another read-optimizing technique, one or more indexes may be created to enable the SMS to quickly identify respective subsets of the stream data records which are to be provided in response to read requests from respective clients. Other types of read-optimizing operations may also or instead be implemented in various embodiments.

In at least some embodiments, several different types or categories of data streams may be supported at an SMS, with respective sets of programmatic interfaces (or respective sets of parameter options for programmatic interfaces) being implemented for configuring and using the streams. For example, in one embodiment, by default, a stream object may be created in un-syndicated mode, such that initially only the owner (the entity requesting the creation of the stream) may have permissions to write to and read from the stream. In un-syndicated or default mode, attaching of virtual streams may not be permitted in at least some embodiments. A default or un-syndicated stream may be converted to a syndicated stream as a result of a programmatic request submitted by or approved by the stream owner in at least some embodiments. In at least one embodiment, a syndicated stream may be converted to a default or un-syndicated stream in response to another type of programmatic request. A virtual stream may be created and attached to a syndicated stream via one or more programmatic interfaces in various embodiments, e.g., as a result of a request submitted by a candidate consumer. The SMS may attempt to verify, based on the access policy associated with the syndicated stream, whether the submitter of an attach request is granted permission to access the contents of the specified syndicated stream, and the request may be rejected if the requester is not authorized. A given virtual stream may be detached from one syndicated stream and attached to another in at least some embodiments. In various embodiments, the SMS may treat instances of each of the stream types (e.g., default, syndicated and virtual) as first-class objects. Thus, for example, in one embodiment in which the equivalent of a listStreams or showStreamsStatus interface may be used by a client of the SMS to view the status of streams established on behalf of the client, a listing including status information for zero or more virtual, syndicated or un-syndicated streams established for the client may be provided.

In at least some embodiments, one or more rules regarding the manner in which attributes of data records are to be used to filter contents of a syndicated stream may be included in the access policies associated with the syndicated stream. For example, in one embodiment a given data record of a given syndicated stream may comprise a combination of some or all of the following constituent elements: a data payload, a sequence number, a partition identification element, and/or one or more syndicated tags. The data payload may comprise the portion of the stream's data being stored in the record. The sequence number may be indicative of the order (relative to other data records of the same stream) in which the data record was processed or received by the SMS. The partition identification element may indicate a particular logical partition of the stream to which the data record is assigned, and may in some cases be selected for example based on the source data producer or on other factors such as the aggregate size of the data stream. Tags may comprise labels usable for selecting subsets of the data stream for distribution to respective clients—e.g., a respective tag indicating a department name may be used to distribute stream records among several different departments of an organization. In at least some embodiments, programmatic interfaces of the SMS may be used to associate various tags with stream data records, and/or to define attribute-based rules to be used for distributing data records. A filtering rule may, for example, indicate various predicates on any combination of the elements to select a data record for a given consumer of a syndicated stream. For example, the logical equivalents of "if (record.tag 'department-A') provide record to consumer in list {dept-A}", or "if (record.data.payload contains 'London') provide record to consumer in list {UK-consumers}" or "if (record.partitionID==P1) provide record to consumer in list {P1-consumers}" or "if (record.sequenceNumber in range [SN1-SN2] provide record to consumer in list "Listl}" may be used as rules for filtering data records in various embodiments. It is noted that at least in some embodiments, a given data record of a given syndicated stream may be accessed by multiple consuming entities—e.g., zero or more consumers may be provided the contents of the record, depending on the access policy in place.

Some types of stream operations (such as stream creation, deletion, status changes from un-syndicated to syndicated or from syndicated to un-syndicated, or repartitioning operations) that involve interactions with SMS administrative or control components may be referred to as "control-plane" operations in various embodiments. Operations such as data record submissions, storage and retrievals that typically (e.g., under normal operating conditions) do not require interactions with control components may be referred to as "data-plane" operations in some embodiments. Dynamically provisioned sets of compute, storage and networking resources may be used to implement the service in various embodiments, based for example on partitioning policies that allow the stream management workload to be distributed in a scalable fashion among numerous service components. In at least some embodiments, an SMS may implement replication of data records to meet desired availability and/or data durability goals, in addition to replications performed for read optimization of syndicated streams.

Example System Environment

FIG. 1 illustrates an example system environment in which a service for managing several types of data streams, including un-syndicated, syndicated and virtual data streams, may be implemented, according to one embodiment. As shown, system 100 may comprise a stream management service (SMS) 102 in the depicted embodiment. The SMS 102 may comprise an ingestion subsystem 111, a storage subsystem 112, a retrieval subsystem 113, and control-plane subsystem 140 in the depicted embodiment. Each of the SMS subsystems may include one or more nodes or components, implemented for example using respective executable threads or processes instantiated at various resources of a provider network (or a client-owned or third-party facility) in various embodiments. Nodes of the ingestion subsystem 111 may be configured (e.g., by nodes of the control-plane subsystem 140) to obtain data records of a particular data stream from data producers 110 (such as 110A, 110B, or 110C) based on a partitioning policy in use for the stream, and each ingestion node may pass received data records on to corresponding nodes of the storage subsystem 112 in the depicted embodiment. The storage subsystem nodes may save the data records on any of various types of storage devices in accordance with a persistence policy selected for the stream, e.g., a policy which comprises goals for data durability, availability and/or performance. Nodes of the retrieval subsystem 113 may respond to read requests from stream data consumers, such as consumers 165A or 165B. It is noted that respective subsystems and processing stages similar to those illustrated in FIG. 1 for a particular stream may be instantiated for other streams as well. In some embodiments, a respective set of configuration information may be stored for each stream at the control plane subsystem 140, e.g., as part of configuration metadata 145.

In at least one embodiment, when a particular data stream is created or initialized, e.g., in response to an invocation of a createStream programmatic interface, a partitioning policy may be activated for the stream, which may be used to determine the partition of which any given data record of the stream is to be considered a member. The particular nodes of the ingestion subsystem 111, the storage subsystem 112, and/or the retrieval subsystem 113 that are to perform operations for a given data record may be selected on the basis of the record's partition. For example, nodes 122A of the ingestion subsystem may be responsible for ingestion (receiving data records from data producers) operations for partition 0 of stream 1 (hence the notation Str1-Part0), nodes 122B of the ingestion subsystem may be responsible for ingestion operations for partition 1 of stream 1 (Str1-Part1), etc. Similarly, nodes 124A of the storage subsystem 112 may be used to store data records of Str1-Part0, nodes 124B may be used to store data records of Str1-Part1, nodes 126A of retrieval subsystem may be responsible for responding to read requests directed to Str1-Part0 from consumers 165, and nodes 126B may be responsible for responding to read requests directed to Str1-Part0 from consumers 165. In one embodiment, at least a subset of the control subsystem nodes used for a given data record may be selected based on the partition as well. Any of a number of different partitioning policies may be employed at the SMS in different embodiments. In various embodiments, the partition selected for a given data record may be dependent on a partitioning key for the record, whose value may be supplied by the data producer either directly (e.g., as a parameter of a write or put request), or indirectly (e.g., the SMS may use metadata such as the identifier or name of the data producer client, an IP address of the data producer, or portions of the contents of the data record as a partition key). In one embodiment, partitioning may not be employed for at least some streams. In at least some embodiments, dynamic repartitioning of a data stream may be supported as part of the partitioning policy, e.g., in response to triggering conditions indicated in the policy or in response to explicit requests.

In the depicted embodiment, the SMS 102 may implement several sets of programmatic interfaces, including for example administrative programmatic interfaces 176, producer programmatic interfaces 162, and consumer programmatic interfaces 182. The programmatic interfaces may include, for example, respective sets of application programming interfaces (APIs), web-based consoles, command-line tools and/or graphical user interfaces in various embodiments. SMS users or clients 166 may submit requests for various configuration-related operations to control plane subsystem 140 via administrative interfaces 176 in the depicted embodiment. For example, a createStream interface may be used to request the creation of a default (un-syndicated and non-virtual) stream, a syndicated stream or a virtual stream, with the type of stream being indicated by the mode parameter. As discussed below in further detail, among the three categories of streams supported in at least some embodiments, default and syndicated streams may be writeable (i.e., new data records may be inserted into default or syndicated streams), while virtual streams may be read-only, with no data record insertions permitted on the virtual streams themselves. It is noted that in some embodiments, by default a stream may be created as a syndicated stream, or as a virtual stream—that is, the default mode of operation of a stream may not necessarily be non-syndicated and non-virtual. The entity (e.g., an SMS client or client account) on whose behalf a stream is created may be referred to as an owner of the created stream in various embodiments. In the depicted environment, virtual streams may be configured as read-only objects, while writes (as well as reads) may be permitted on syndicated and default (un-syndicated) streams.

A modifyStream interface may be used, for example, to request that a currently existing writeable un-syndicated stream be designated as a syndicated stream, and/or to make other configuration changes such as changes to a managed access policy 144 associated with a specified stream. In response to a modifyStream request with the parameter syndicated set to true and a targeted stream identifier parameter indicating an existing stream, for example, the SMS control plane subsystem may store configuration information in metadata 145 indicating that the existing stream has been configured as a syndicated stream, enabling one or more data consumers 165 to read contents of the existing stream by attaching a respective virtual stream to the syndicated stream. In effect, the designation "syndicated", when applied to a default stream, may simply result in the creation of metadata indicating that virtual streams are to be used as the mechanism to access data records in the depicted embodiment, and may not necessarily affect the manner in which the data records are stored, or the types of write operations supported for the stream. In at least one embodiment, when an un-syndicated stream is designated as a syndicated stream, additional storage space may be allocated and at least some data records of the syndicated stream may be stored in the additional storage space. Individual ones of the streams designated as syndicated streams may have respective managed access policies 144 associated with them, which may for example indicate the particular data consumers 165 allowed access, the manner in which the data records of the stream are to be filtered (if filtering is to be employed) for various consumers, and so on. Other example elements of managed access policies 144 are discussed below in the context of FIG. 6. The deleteStream interface may be used to discard or remove a stream in the depicted embodiment. A listStreams interface may be used to obtain a listing of a set of streams, together with status information pertaining to the listed streams, to which the requester is granted at least read access in various embodiments. The response to a particular listStreams invocation may include names and/or status information of several different types of streams accessible to the requester, potentially including virtual, syndicated and default streams.

In at least some embodiments, a virtual stream may serve as a mechanism to enable a data consumer to view contents of some or all data records of a syndicated stream. Thus, for example, in the depicted embodiment, the data records accessed via read requests directed at a virtual stream may be stored using storage space assigned to a default stream which has been designated as a syndicated stream, and additional storage space may not be allocated for the records of the virtual stream itself. Writes (e.g., additions of new data records) to virtual streams may not be permitted in various embodiments. The information provided to a data consumer 165 regarding a virtual stream set up on behalf of the data consumer may include, for example, an indication of the syndicated stream to which the virtual stream is programmatically attached—e.g., an indication that one or more data records of a particular syndicated data stream can be read or accessed via the virtual stream.

Producer programmatic interfaces 162, such as a putRecord interface, may be invoked by various data producers 110 to add new records to existing writeable data streams (e.g., to streams other than virtual streams) in the depicted embodiment. As indicated in FIG. 1, the putRecord interface may be used to write to default streams as well as to syndicated streams; the interactions used for writing to a stream may not change as a result of designating the stream as a syndicated stream. Consumer programmatic interfaces 182 may include, for example, a getIterator interface, a getRecord interface and/or a getNextRecords interface in the depicted embodiment. As indicated by the name, a getIterator interface may be used to obtain an iterator object which can then be used to iteratively read records (e.g., using getNextRecords) starting from a particular offset (e.g., a sequence number based offset) from within a stream. The getRecord interface may enable random access (e.g., as opposed to iterator-based sequential access) to data records within a data stream in some embodiments. A given data consumer 165 may read records from any of the various types of streams supported by the SMS in the depicted embodiment (as long as that consumer 165 has the appropriate permissions on the stream being read). For example, data consumer 165A may read records of default or un-syndicated streams, while data consumer 165B may read records of a virtual stream attached to a syndicated stream. In at least one embodiment, writes may not be permitted to syndicated data streams directly instead, for example, writes may be directed to the underlying un-syndicated data stream, and the contents of the writes may be accessed by consumers using virtual streams. In other embodiments, writes may be permitted on syndicated streams directly—e.g., an invocation of the putRecord interface may include a parameter indicating an identifier of a syndicated stream as the stream to which a record is to be added.

In various embodiments, the SMS control plane subsystem 140 may initiate various operations to optimize or improve the performance of reads directed to syndicated streams. For example, as discussed below in further detail, in some embodiments replicas of a stream's records may be stored, e.g., on different storage devices than an original set of storage devices which may have been provisioned to meet availability and/or data durability requirements. In other embodiments, indexes may be created on stream records to speed retrieval of subsets of data records based on the records' contents or attributes.

In at least some embodiments, at least some of the nodes of the subsystems shown in FIG. 1 may be implemented using provider network resources. As noted earlier, networks set up by an entity such as a company or a public sector organization to provide one or more network-accessible services (such as various types of cloud-based database, computing or storage services) accessible via the Internet and/or other networks to a distributed set of clients may be termed provider networks in such embodiments. Some of the services may be used to build higher-level services: for example, computing, storage or database services may be used as building blocks for a stream management service or a stream processing service. At least some of the core services of a provider network may be packaged for client use in service units called "instances": for example, a virtual machine instantiated by a virtualized computing service may represent a "compute instance", and a storage device such as a block-level volume instantiated by a storage service may be referred to as a "storage instance", or a database management server may be referred to as a "database instance". Computing devices such as servers at which such units of various network-accessible services of a provider network are implemented may be referred to as "instance hosts" or more simply as "hosts" in various embodiments. Nodes of the ingestion subsystem 111, the storage subsystem 112, the retrieval subsystem 113, and/or the control plane subsystem 140 may comprises threads or processes executing at various compute instances on a plurality of instance hosts in some embodiments. A given instance host may comprise several compute instances, and the collection of compute instances at a particular instance host may be used to implement nodes for various different streams (or stream partitions) of one or more clients 166. Storage instances may be used for storing the data records of various streams in some embodiments. Over time, control subsystem nodes may modify the populations of other subsystems dynamically in response to various triggering conditions, e.g., by adding or removing nodes, changing the mappings of nodes to processes or compute instances or instance hosts, or re-partitioning a given stream while still continuing to receive, store and process data records.

In the context of embodiments in which provider network resources are used for stream-related operations, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of a provider network. Clients of one service may themselves be implemented using resources of another service—e.g., a stream data consumer (a client of a stream management service) may comprise a compute instance (a resource provided by a virtualized computing service). A given client may act as both a data producer and a data consumer in at least some embodiments.

Example Stream Record Contents

Figure 2:
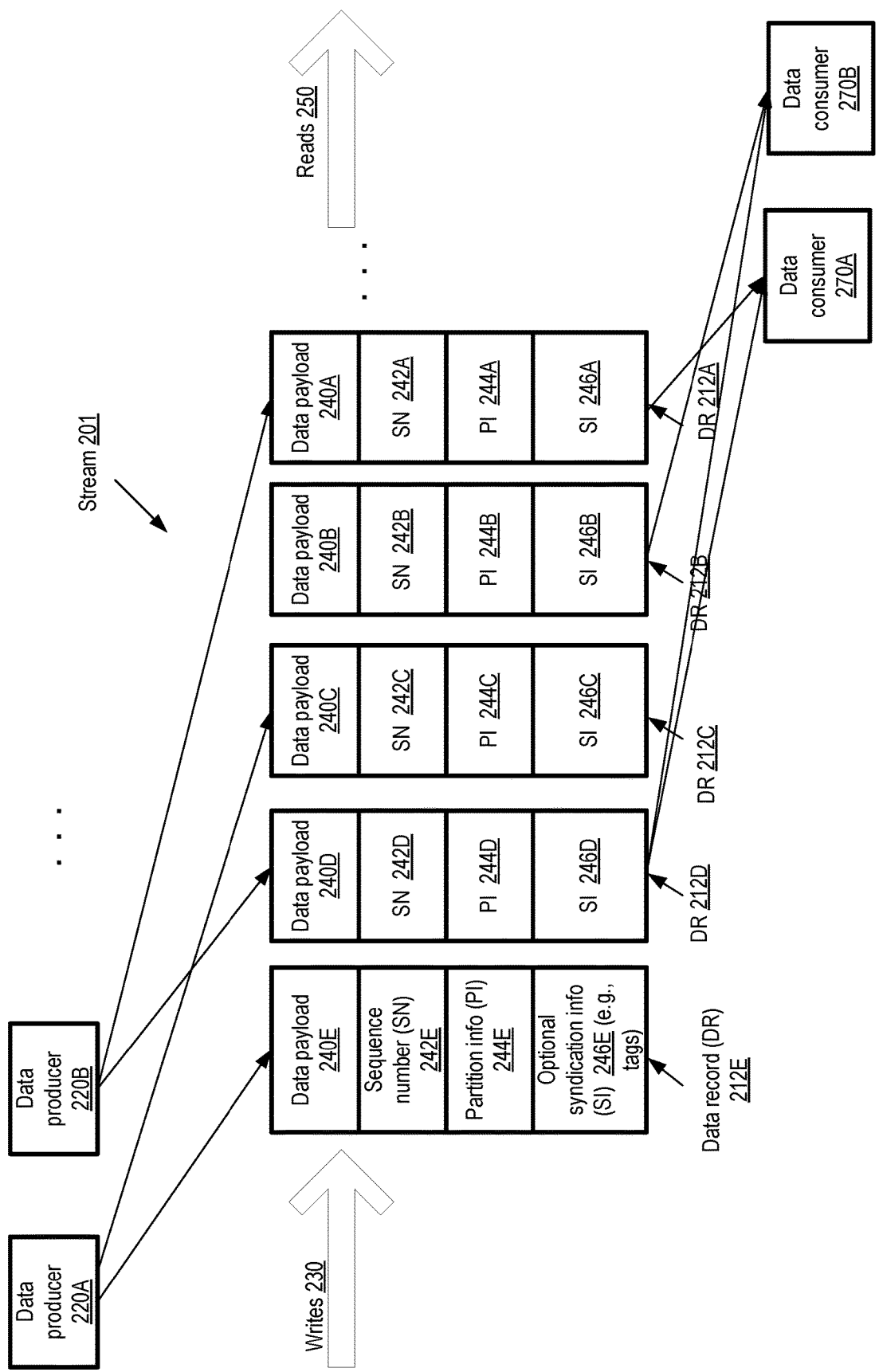
FIG. 2 illustrates example contents of data records which may be stored at a stream management service, according to at least some embodiments.

FIG. 2 illustrates example contents of data records which may be stored at a stream management service, according to at least some embodiments. As shown, a stream 201 may comprise a plurality of data records (DRs) 212, such as DRs 212A-212E, resulting from write requests 230 originating at one or more data producers 220, such as data producers 220A or 220B. The write requests may be submitted, for example, to a stream management service using the producer programmatic interfaces 162 discussed in the context of FIG. 1. A number of different types of data producers may generate streams of data in different embodiments, such as, for example, sensor arrays, social media platforms, logging applications or system logging components, monitoring agents of various kinds, and so on.

The DRs may be stored, e.g., at various storage devices of a storage subsystem of an SMS, in an order indicated by respective sequence numbers (SNs) 242, such as 242A-242E corresponding to the DRs 212A-212E respectively in the depicted embodiment. The sequence numbers may be determined at the SMS in some embodiments—e.g., the next-higher unique unused sequence number may be determined at the SMS in response to receiving a write request, and assigned to the submitted DR. In some embodiments, the sequence number may include a representation of a timestamp corresponding to the receipt or processing of the corresponding write request. The sequence numbers of the data records of a given stream or partition need not always be consecutive in some embodiments. In one implementation, data producers 220 may provide, as part of a write request, an indication of a minimum sequence number to be used for the corresponding data record. In some implementations in which data streams are partitioned, sequence numbers may be assigned on a per-partition basis—for example, although the sequence numbers may indicate the order in which data records of a particular partition are received, the sequence numbers of data records DR1 and DR2 in two different partitions may not necessarily indicate the relative order in which DR1 and DR2 were received. In other implementations, the sequence numbers may be assigned on a stream-wide rather than a per-partition basis, so that if sequence number SN1 assigned to a data record DR1 is lower than sequence number SN2 assigned to data record DR2, this would imply that DR1 was received earlier than DR2 by the SMS, regardless of the partitions to which DR1 and DR2 belong.

In one embodiment, in response to a write request, a stream data producer may be provided with a sequence number 242 that has been chosen for the submitted record. In at least some embodiments, an ingestion node of the SMS may obtain at least a portion of the sequence number from the storage subsystem. For example, in one such embodiment a sequence number 242 may be determined subsequent to the storage of the received data record in accordance with an applicable persistence policy, and the storage subsystem may generate a numerical sequence indicator of its own for the data record and provide that indicator for inclusion in the larger sequence number assigned to the data record by the ingestion node. Sequence numbers 242 may be implemented in various embodiments to provide a stable, consistent ordering of data records, and to enable repeatable iteration over records by data consumers. Sequence numbers assigned to the data records of a particular partition may increase monotonically over time, although as mentioned above they need not be consecutive in at least some implementations. In various embodiments, sequence numbers may be assigned with at least some subset of the following semantics: (a) sequence numbers are unique within a stream, i.e., no two data records of a given stream may be assigned the same sequence number; (b) sequence numbers may serve as indexes into the stream's data records, and may be used to iterate over data records within a given stream partition; (c) for any given data producer, the order in which the data producer successfully submitted data records may be reflected in the sequence numbers assigned to the data records; and (d) sequence numbering for data records with a given partition key value may retain the monotonically increasing semantics across dynamic repartitioning operations—e.g., the sequence numbers assigned to data records with a partition key value K1 after a repartitioning may each be larger than any of the sequence numbers that were assigned to data records with that partition key value K1 prior to the dynamic repartitioning.

Each DR 212 may comprise a respective data payload 240 (e.g., payload 240A-240E) representing the semantic content of the DR in the depicted embodiment. The size of the data payload 240 may vary from one DR to another in some embodiments. In one embodiment, data producers 220 may submit write requests that contain pointers to (or addresses of) the data payloads of the data records, e.g., by providing a storage device address (such as a device name and an offset within the device) or a network address (such as a URL) from which the data portion may be obtained.

In some embodiments, a write request 230 may comprise an indication 244 of a partition to which the corresponding data record is to be assigned, such as a partition key which can be hashed to determine a partition identifier. The submitted partition information 244 (e.g., partition information 244A-244E) and/or the partition identifier determined from the partition information may be stored as part of the data record 212 in the depicted embodiment.

In the depicted embodiment, a given data record may comprise optional syndication information 246 (e.g., 246A-246E) such as one or more text tags or labels. The tags or other syndication information may be used to filter different subsets of data records of the stream for read requests 250 received from different data consumers 270 (e.g., 270A or 270B) in the depicted embodiment. As indicated by the arrows from the data consumers and the arrows to the data producers, different subsets of a data stream may be generated by respective data producers in some embodiments, and/or different subsets of a data stream may be read by different data consumers.

Syndication Example: Log Records

Figure 3:
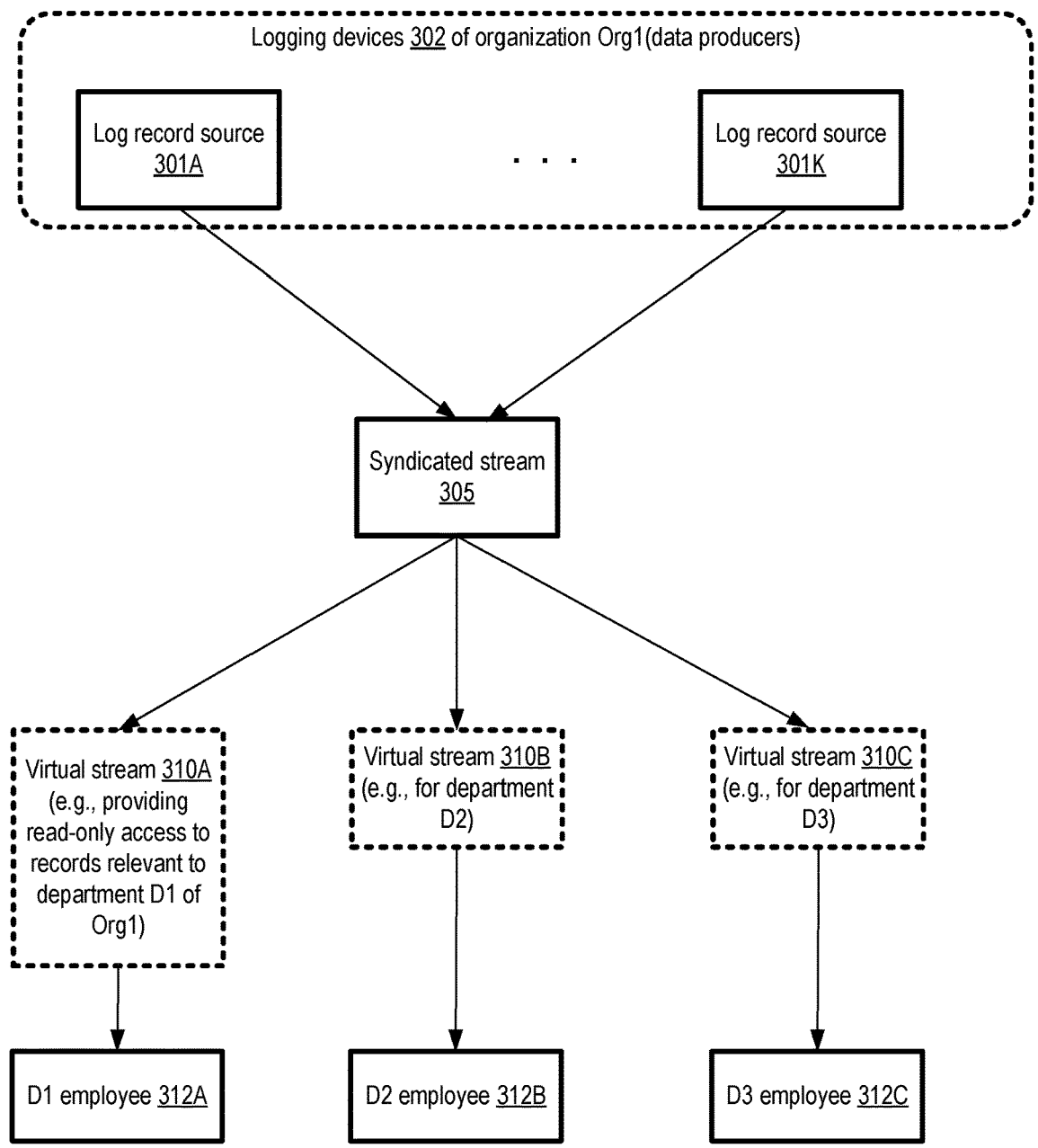
FIG. 3 illustrates an example use of a syndicated data stream for log records of an organization, according to at least some embodiments.

FIG. 3 illustrates an example use of a syndicated data stream for log records of an organization, according to at least some embodiments. In the depicted embodiment, an organization Org1 may own a plurality of devices at one or more data centers (such as various hosts at which applications are executed, storage devices, networking devices, and the like) which generate log records of events. The log records may be generated at various levels of the hardware/software stack in different embodiments, such as by applications, operating systems, firmware, and so on, and may be expressed in a variety of formats. The collection of logging devices 302 of organization Org1 may thus include a variety of log record sources 301A-301K in the depicted embodiment.

For various reasons, e.g., for cost savings or to simplify administration, it may be advantageous from the perspective of Org1's managers or other decision makers to store the log records from several or all of the log record sources 301 at a single syndicated data stream 305 in the depicted embodiment. Furthermore, based on the semantics of the data payloads of the records stored in stream 305, respective subsets of the records may be of interest to respective subsets of employees of Org1 in the depicted embodiment. Accordingly, respective virtual streams 310, such as 310A-310C, may be set up on behalf of respective employee subsets or departments (e.g., departments D1, D2 or D3) of Org1 in the depicted embodiment. A managed access policy associated with syndicated data stream 305 may, for example, comprise filtering rules indicating the particular subsets of the data records which are to be provided in read-only mode to various subgroups of employees via the corresponding virtual streams 310 in the depicted embodiment. A given virtual stream 310 may not be usable to view subsets of log records other than those indicated in the filtering rule(s) designated for that virtual stream, and no writes may be permitted via virtual streams in the depicted embodiment.

Employees of department D1, such as an employee 312A, may access a subset of records of the syndicated stream 305 via virtual stream 310A, but may not be authorized to access any of the other virtual streams or the syndicated stream directly. Similarly, employees of departments D2 and D3, such as employees 312B and 312C respectively, may only be permitted to read records of the stream 305 via respective virtual streams 310B and 310C in the depicted scenario. Using the syndicated and virtual streams may thus simplify the task of managing the distribution of log information in the depicted embodiment while minimizing the number of separate writeable streams configured.

Read-Optimizing Operations

Figure 4:
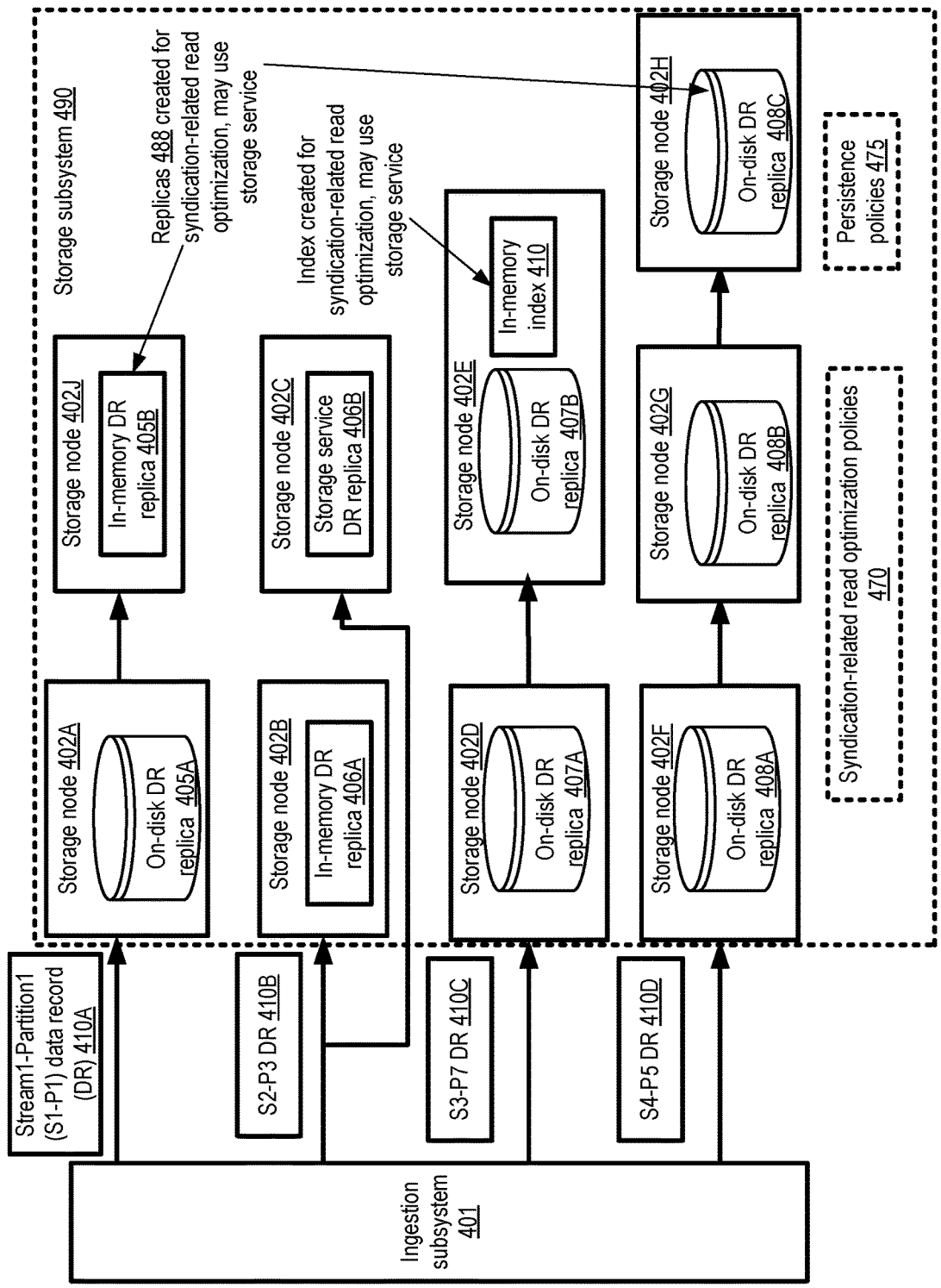
FIG. 4 illustrates examples of read-optimizing operations which may be performed to support accesses to syndicated data streams by multiple consumers, according to at least some embodiments.

FIG. 4 illustrates examples of read-optimizing operations which may be performed to support accesses to syndicated data streams by multiple consumers, according to at least some embodiments. In the depicted embodiment, one or more copies or replicas of individual data records submitted by data producers to an ingestion subsystem 401 may be stored, e.g., at respective storage devices of storage subsystem 490 of a stream management service (SMS). The number of replicas that are stored for a given data record of a given stream partition, and the kinds of devices on which they are stored, may be determined (e.g., by control plane components of the SMS) based on persistence policies 475 and/or on syndication-related read optimization policies 470 in some embodiments. Different policies with respect to persistence and/or read optimization may be enforced for respective streams (or stream partitions) in some embodiments, e.g., based on parameters indicated to the SMS at stream creation time by stream owners. In at least one embodiment, the policy to be applied to a given stream may be modified after the stream has been created, e.g., using a modifyStream interface.

In various embodiments, for each partition of each (non-virtual) stream, the SMS may initially provision sufficient storage resources to provide a desired level of data durability and availability as indicated by the stream's persistence policy 470. For example, in the scenario depicted in FIG. 4, for data records 410A of partition 1 of a stream S1 (S1-P1), a single on-disk replica 405A may initially be stored at a storage node 402A in accordance with stream 1's persistence policy. With respect to data records 410B of S2-P3 (partition 3 of stream S2), a pair of replicas 406A and 406B may be stored initially at respective storage nodes 402B and 402C, based on the persistence policy of stream S2. In at least some embodiments, the provider network at which an SMS is implemented may comprise several types of storage services, such as a storage service which enables access to unstructured storage objects via web-services interfaces, a storage service which presents block-level interfaces to storage volumes, and so on. In some such embodiments, resources of some of these storage services may be used for replicas of data records, such as storage service DR replica 406B. Such storage services may also be used for replicas and/or indexes created for read optimizations related to syndication in various embodiments. In FIG. 4, for partition 7 of stream S3 (S3-P7) records 410C, two on-disk replicas 407A and 407B at respective storage nodes 402D and 402E may be stored in accordance with stream S3's persistence policy, while for data records 410D of S4-P5, two on-disk replicas 408A and 408B on nodes 402F and 402G may be stored in compliance with stream S4's persistence policy.

Shared read-only access to some of the streams represented in FIG. 4 may be enabled in the depicted embodiment, e.g., by configuring the streams as syndicated streams and enabling respective sets of data consumers to attach virtual streams to the syndicated streams. Based on various factors such as the number of virtual streams attached, the measured performance of reads from the consumers, and the read optimization policies 475 applicable to the streams S1-S4, any of several types of read optimization operations may be performed by the SMS over time. For example, with respect to S1, the SMS may initiate the storage of a second replica 405B of records 410A at storage node 402J. The second replica 405B may be maintained in memory rather than being stored on disk in the example scenario shown, e.g., with the number of additional replicas and the type of storage device used being selected based on the read optimization policy of S1. For stream S4, a third on-disk replica 408C may be created on storage node 402H to improve read performance in the depicted scenario, in accordance with the read optimization policy 475 of S4. For stream S2, instead of (or in addition to) creating additional replicas, an index 410 may be created in accordance with the applicable read optimization policy, e.g., in memory at storage node 402C. The keys of the index may be selected based at least in part on the filtering rules for the stream S2 if such filtering rules exist. In the absence of filtering rules, any appropriate combination of the attributes or properties of the data records, including for example elements of the data payloads, may be used as index keys in various embodiments. Replicas such as 405B and 408C may be referred to as read optimization-related replicas in some embodiments. In at least one embodiment, as mentioned earlier, resources of one or more other network-accessible storage services may be used for the read optimization-related replicas and/or indexes. In at least some embodiments, the geographical distribution of the read requests directed to syndicated streams may be taken into account when creating read optimization-related replicas or indexes. For example, if a substantial fraction of the read requests directed via virtual streams to stream S4 originate in a particular state or region, and the SMS operator has a data center near the source of that fraction of read requests, storage nodes located near the read request sources may be used for the additional replicas and/or the indices in some embodiments.

As new records are added to the streams S1-S4, in some embodiments the new records may be propagated asynchronously to the read optimization related storage nodes such as 402J and 402H. In one embodiment, the read optimization-related replicas of data records (e.g., replicas 405B or 408C) may be created after a response indicating that the corresponding write has been committed has been provided to the data producer. In other embodiments, the commit of a write may not be considered completed until all the replicas, including the read optimization related replicas, have been successfully written to their respective storage devices.

Example Programmatic Interactions

Figure 5:
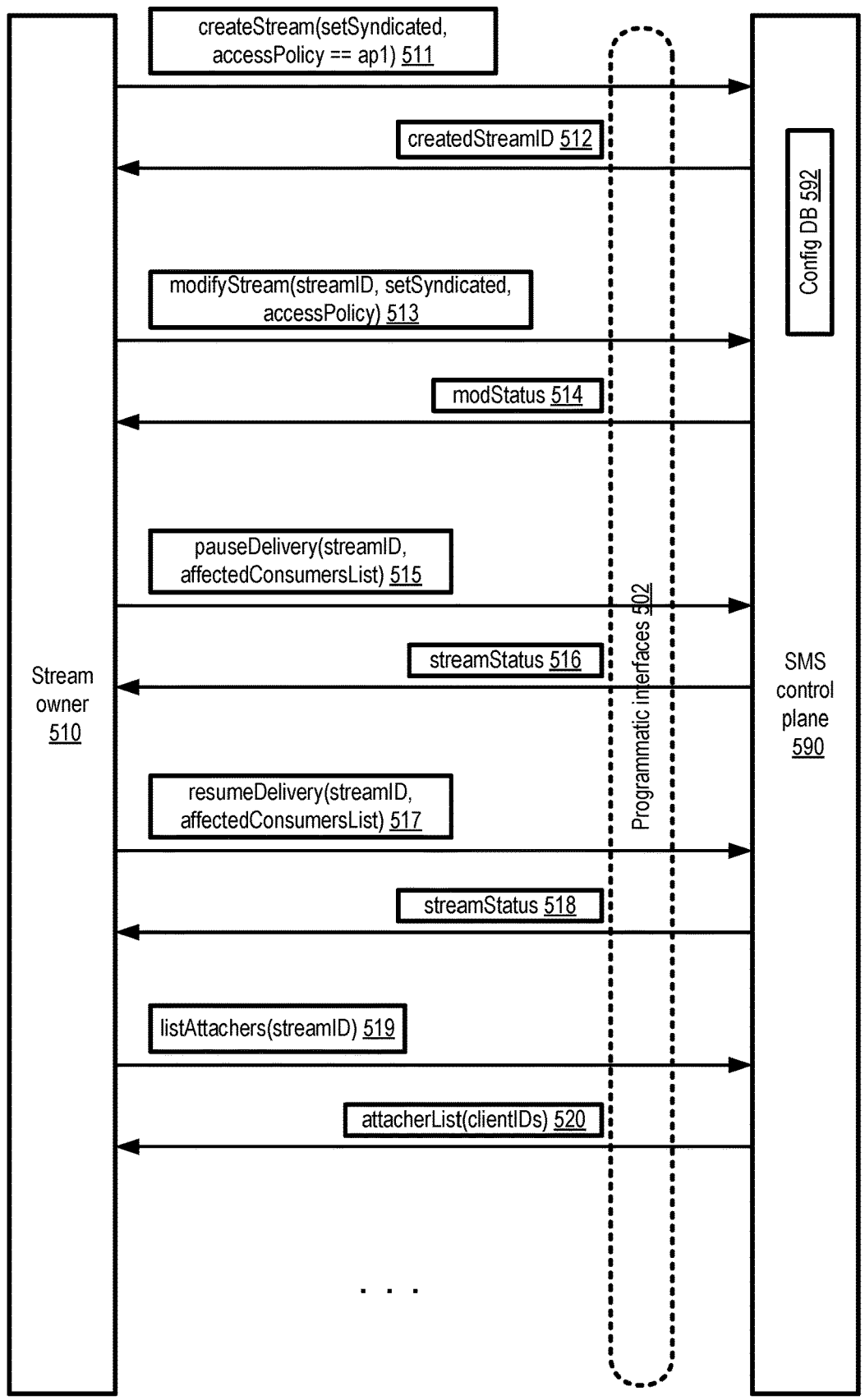
FIG. 5 illustrates example interactions between a stream owner and a control plane of a stream management service, according to at least some embodiments.

FIG. 5 illustrates example interactions between a stream owner and a control plane of a stream management service, according to at least some embodiments. As mentioned earlier, in various embodiments, the entity (e.g., user account) from which a request for the creation of a stream is received, and on whose behalf the stream is created at an SMS, may be referred to as the owner of the stream. At least by default in various embodiments, the stream owner may be granted write, modify and read permissions on the stream created on the owner's behalf. In the depicted embodiment, only a syndication-related subset of the kinds programmatic interactions that a stream owner 510 may have with the control plane 590 of the SMS are shown; other interactions unrelated to syndication management are omitted.

At least two ways of requesting the establishment of a syndicated stream via the SMS administrative programmatic interfaces 502 may be supported in the depicted embodiment. In the first approach, the stream owner 510 may submit a createStream request 511 with the parameter setSyndicated set to true and the accessPolicy parameter indicating the rules applicable to the read-only accesses to be permitted on the stream. Example contents of the access policies are discussed below in the context of FIG. 6. In response, the SMS control plane 590 may generate and store configuration metadata in its configuration database 592, and send back a response 512 comprising an identifier of the created syndicated stream in the depicted embodiment.

In the second approach towards configuring a syndicated stream, a stream owner 510 may first create a baseline or default stream which is not syndicated (e.g., by issuing a createStream request which does not have a setSyndicated parameter set to true), and then later request that the stream be modified to syndicated mode to enable shared read-only access via virtual streams. A modifyStream request 513 indicating the identifier streamId of the default/baseline stream, a setSyndicated parameter set to true, and an accessPolicy parameter for the requested syndicated stream may be submitted. In response, the SMS control pane 590 may make the appropriate configuration changes in database 592 and send back a response 514 comprising the status of the requested modification (e.g., the value of a parameter modStatus in the response may be set to "success" to indicate that the requested configuration change has succeeded). A syndicated stream may be reconfigured as a default or un-syndicated stream in at least some embodiments by a different modifyStream request (e.g., with setSyndicated set to false), reversing the change corresponding to request 513.

In the depicted embodiment, the stream owner may request that delivery of data records of a syndicated stream to one or more consumers be paused or resumed, e.g., by submitting a pauseDelivery request 515 or a resumeDelivery request 517. The syndicated stream whose delivery is to be paused or resumed may be indicated in the request by a stream identifier parameter streamID, and the set of consumers to whom delivery is to be paused or resumed may be indicated via an affectedConsumers parameter. The control plane 590 may respond by making the appropriate changes to database 592 and providing updated status of the stream in a streamStatus response 516 or 518 in the depicted embodiment. The owner may be able to obtain a list of the virtual streams (as well as the clients on whose behalf the virtual streams have been created) attached to a specified stream by submitting a listAttachers request in the depicted embodiment, with the attached-to stream being identified by a streamID parameter. In response the SMS control plane may provide attacherList 520 indicating available information about the attached virtual streams, such as the client identifiers (clientIDs) corresponding to the attached virtual streams. A number of other types of programmatic requests relate to syndication, such as performance monitoring requests and the like with respect to various attached virtual streams, may also or instead be submitted by stream owners in various embodiments to the SMS control plane.

Figure 6:
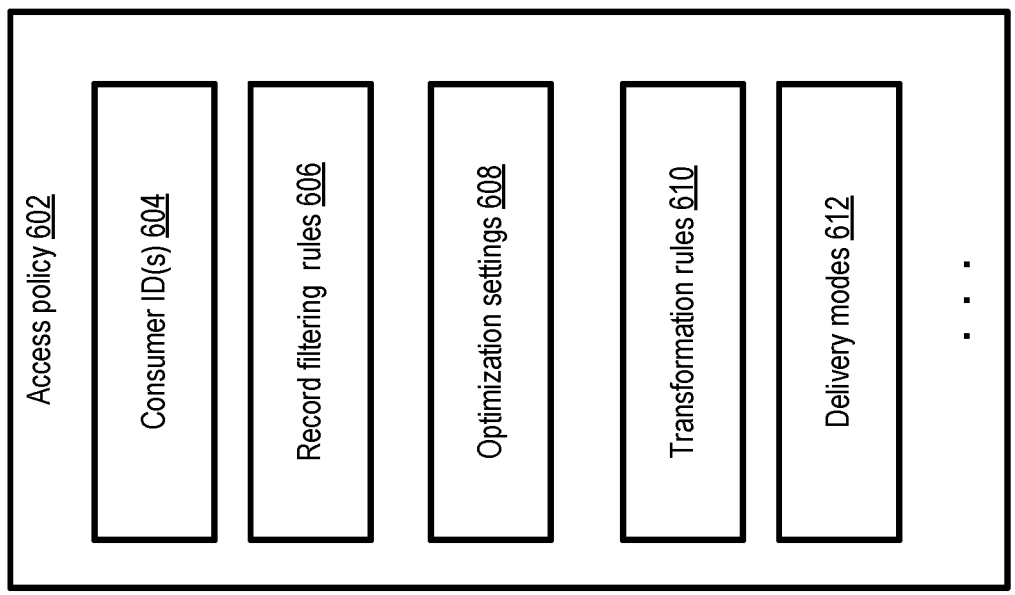
FIG. 6 illustrates example constituent elements of an access policy which may be associated with a syndicated data stream, according to at least some embodiments.

FIG. 6 illustrates example constituent elements of an access policy which may be associated with a syndicated data stream, according to at least some embodiments. In the depicted embodiment, an access policy 602 which is to be enforced for a particular syndicated stream may comprise, among other elements, a consumer ID list 604, one or more record filtering rules 606, read optimization settings 608, transformation rules 610, and/or delivery modes 612.

In the depicted embodiment, the consumer ID list 604 may identify the entities or clients to whom contents of the syndicated stream's data records may be provided, e.g., in response to read requests directed to virtual streams which have been programmatically attached to the syndicated stream. The contents or data payloads of the records may be provided in raw or processed form in various embodiments, for example depending at least in part on the other elements of the access policy 602.

Record filtering rules 606 may indicate, for example, the criteria to be used to determine whether any given data record of the syndicated stream is to be provided to a given consumer indicated in the consumer ID list. As mentioned earlier in the context of FIG. 2, predicates for the record filtering rules may be defined in terms of any combination of the attributes of the data records, such as sequence number ranges, partition matches, tags, or data payload contents. In at least some embodiments, filtering rules may comprise Boolean combinations of predicates—e.g., the equivalent of "if (partition ID==P1) and (tag==tag1) provide record to consumer C1" may be used as a filtering rule. It is noted that in some embodiments, data payload contents of a particular stream may be considered an un-interpreted binary object, and examination of the contents of such payloads may not be feasible, in which case the filtering rules may be expressed using elements of data records other than data payloads. In at least some embodiments, separate filtering rules may be specified for different consumers or subsets of consumers.

Read optimization settings 608 may indicate, for example, the specific types of read optimization actions to be taken by the SMS, and/or the triggering conditions for such actions. For example, in one scenario a stream owner may indicate that at least one additional replica of the stream's data should be created for every N attached virtual streams, or for every R % increase in aggregate read requests per second. Geographical or location-related considerations for read optimizing operations may also be expressed in the settings 608—e.g., a stream owner may indicate that if more than P % of read requests to a syndicated stream originate within a specified radius of a particular data center at which replicas or indexes of the syndicated stream can be stored, one or more replicas or indexes should be created and maintained at that data center. With respect to indexes, the settings 608 may also indicate threshold conditions which are to trigger the creation of a particular index in some embodiments— e.g., based on the measured rates of random reads and/or on the rate at which the stream is growing. The kinds of storage devices (e.g., rotating disk-based devices, solid state drives, or volatile memory) to be used under various conditions for replicas and/or indexes may be indicated in read optimization settings 608 in some embodiments.

In at least one embodiment, transformation rules 610 may be used to indicate whether the data payload (and/or values of other attributes such as tags) of stream records are to be provided to consumers in raw form, or after some type of transformation operation is applied. Example transformations may include, among others, encryption, compression, restriction/projection (in which only a specified portion identifiable via one or more predicates, rather than all of the data payload, may be provided to the consumer), translation of text from one language to another, and so on in various embodiments. Different transformations may be applied for different consumers and/or for different attached virtual streams in at least some embodiments.

Delivery modes 612 may indicate the particular mechanisms or interfaces which are to be used to provide the content of the data stream to consumers. In some implementations, a push delivery mode may be supported, in which a data record may be provided to a consumer as soon as the data record is stored by the SMS. In a pull delivery mode, the records may be provided in response to explicit read requests directed to an attached virtual stream. In some embodiments, both random access and sequential access may be enabled for the records of a stream, while in other embodiments the delivery modes setting 612 may only allow sequential access to the stream's data records. As with the filtering rules and transformation rules, respective delivery modes 612 may be indicated for different consumers or groups of consumers in some embodiments. In embodiments in which syndicated data streams are established at an SMS which comprises a retrieval subsystem (similar to retrieval subsystem 113 of FIG. 1), the access policies may be provided to, or made accessible to, the nodes of the retrieval subsystem so that the policies may be enforced or applied when consumers attempt to read data from their virtual streams. As discussed below, in some embodiments stream consumers may optionally indicate preferences, with respect to particular virtual streams or particular attach sessions, regarding one or more of the elements shown in FIG. 6. For example, a stream consumer may indicate a filtering rule, a transformation to be performed, and so on. In embodiments in which such preferences are provided, the SMS may be responsible for evaluating the consumer's preferences regarding a particular attach session, and fulfilling the preferences as long as they do not contradict the rules indicated in the applicable access policy. In one embodiment, in a manner similar to the provisioning of additional storage resources for optimizing read performance discussed in the context of FIG. 4, additional compute and/or storage resources may be deployed by the SMS, e.g., at the retrieval subsystem, to perform the transformations indicated in the access rules. In some embodiments, one or more of the access policy elements shown in FIG. 6 may not be supported, and/or elements not shown in FIG. 6 may be included in access policies.

Figure 7:
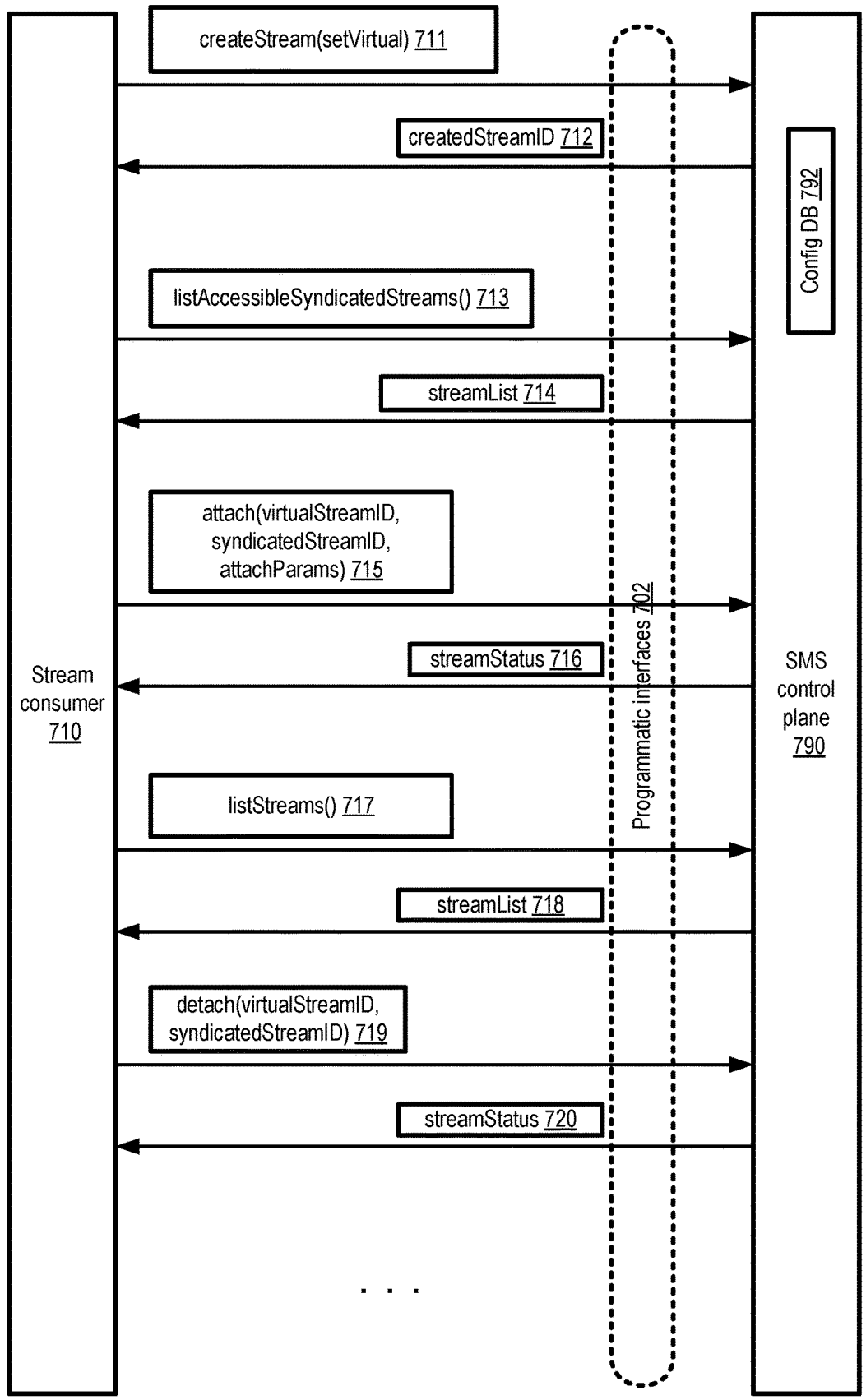
FIG. 7 illustrates example interactions between a stream data consumer and a control plane of a stream management service, according to at least some embodiments.

FIG. 7 illustrates example interactions between a stream data consumer and a control plane of a stream management service, according to at least some embodiments. As in the case of FIG. 5, FIG. 7 focuses on syndication-related interactions, and is not intended to represent an exhaustive list of the types of interactions which may occur among data consumers and the SMS.

A stream data consumer 710 may submit a createStream request 711 to the SMS control plane 790 in the depicted embodiment, with the setVirtual parameter indicating that a virtual stream is being requested. In response, the SMS control plane 790 may add an object or entry representing the virtual stream to its configuration database 792, and provide an identifier createdStreamID of the virtual stream in response 712.

In at least some embodiments, the SMS may enable a consumer 710 to discover syndicated streams to which the consumer has been granted access, or to which the consumer may request that access be granted. In the depicted embodiment, a listAccessibleSyndicatedStreams request 713 may be submitted programmatically by the consumer 710 to discover such streams. In response, the SMS control plane 590 may query its configuration database and provide streamList 714 listing the accessible syndicated streams.

A stream data consumer 710 may submit an attach request 715, specifying a virtual stream (identified by virtualStreamID) and a syndicated stream (identified by syndicatedStreamID) to which the virtual stream should be attached in the depicted embodiment. In at least some embodiments, the consumer's preferences regarding various aspects of the distribution of data records to be accessed via the virtual stream may optionally be indicated in an attach request, e.g., via an attachParams parameter. In the depicted embodiment, the attachParams parameter may include preferences regarding some of the elements of the access policy 602 discussed in the context of FIG. 6. For example, the consumer may indicate zero or more record filtering rules to be applied for the virtual stream for the requested attach session, zero or more read optimization operations that may be performed if needed for the virtual stream, zero or more transformations to be applied to the data records, and zero or more preferences regarding delivery modes to be used. In response, the SMS control plane 790 may evaluate or validate the attachment preferences in view of the access policy associated with the syndicated stream in the depicted embodiment. If one or more incompatibilities are identified between the consumer's preferences and the access policy indicated by the owner of the syndicated stream, in some embodiments the attach request 715 may be rejected. If no incompatibilities are identified, the SMS control plane may modify or create one or more metadata entries in database 792 representing the association of the virtual stream with the syndicated stream, and provide a response indicating the attached status (streamStatus 716) of the virtual stream. In some embodiments, the equivalent of an attachParams parameter may be specified in the request to create the virtual stream, and may thus potentially be used for all the attachment sessions of the virtual stream.

In addition to creating/attaching virtual streams, a given consumer may have created one or more default or un-syndicated streams, or one or more syndicated streams, in the depicted embodiment. In response to a listStreams request 717, the SMS control plane may provide a list of the streams (streamList 718) to which the consumer has read or write access, including any virtual streams, default or un-syndicated streams, and/or syndicated streams as well as corresponding status information in the depicted embodiment. With respect to virtual streams, information about their attach status may also be provided in some embodiments, e.g., indicating whether a given virtual stream is currently attached to a syndicated stream or not, and if it is attached, the particular syndicated stream with which it is associated. In at least one embodiment, identification information regarding the specific syndicated stream to which a virtual stream is attached (if it is in fact currently attached) may not necessarily be provided, or the identity of the syndicated stream may be obfuscated in some way. In one embodiment, instead of identifying the particular syndicated stream to which a virtual stream is attached, the listStreams output may simply indicated whether the virtual stream is currently attached or not.

A specified virtual stream may be detached or dis-associated from a syndicated stream using a detach request 719 in the depicted embodiment. In response to a detach request, the SMS control plane may store or update metadata in database 792 indicating that the virtual stream with identifier virtualStreamID is no longer associated with the syndicated stream with identifier syndicatedStreamID, and provide a response indicating the now detached state of the virtual stream. In the depicted embodiment, a virtual stream that has been detached may later be attached to a different syndicated stream (or even re-attached to the same syndicated stream to which it was attached earlier) using the attach interface. A virtual stream may be treated as a first class object in various embodiments, with its own lifecycle and state, and may not have to be deleted when it is detached. The programmatic interfaces 702 of FIGS. 7 and 502 of FIG. 5 may include, for example, respective sets of application programming interfaces (APIs), web-based consoles, command-line tools and/or graphical user interfaces in various embodiments. It is noted that both FIG. 5 and FIG. 7 provide examples of syndication-related interactions between the entities involved, and are not intended to provide exhaustive lists of syndicated-related interactions. In at least some embodiments, additional programmatic interfaces may be supported for creating chains of syndicated and/or virtual streams as discussed in the context of FIG. 9.

Methods for Supporting Syndicated Streams

Figure 8:
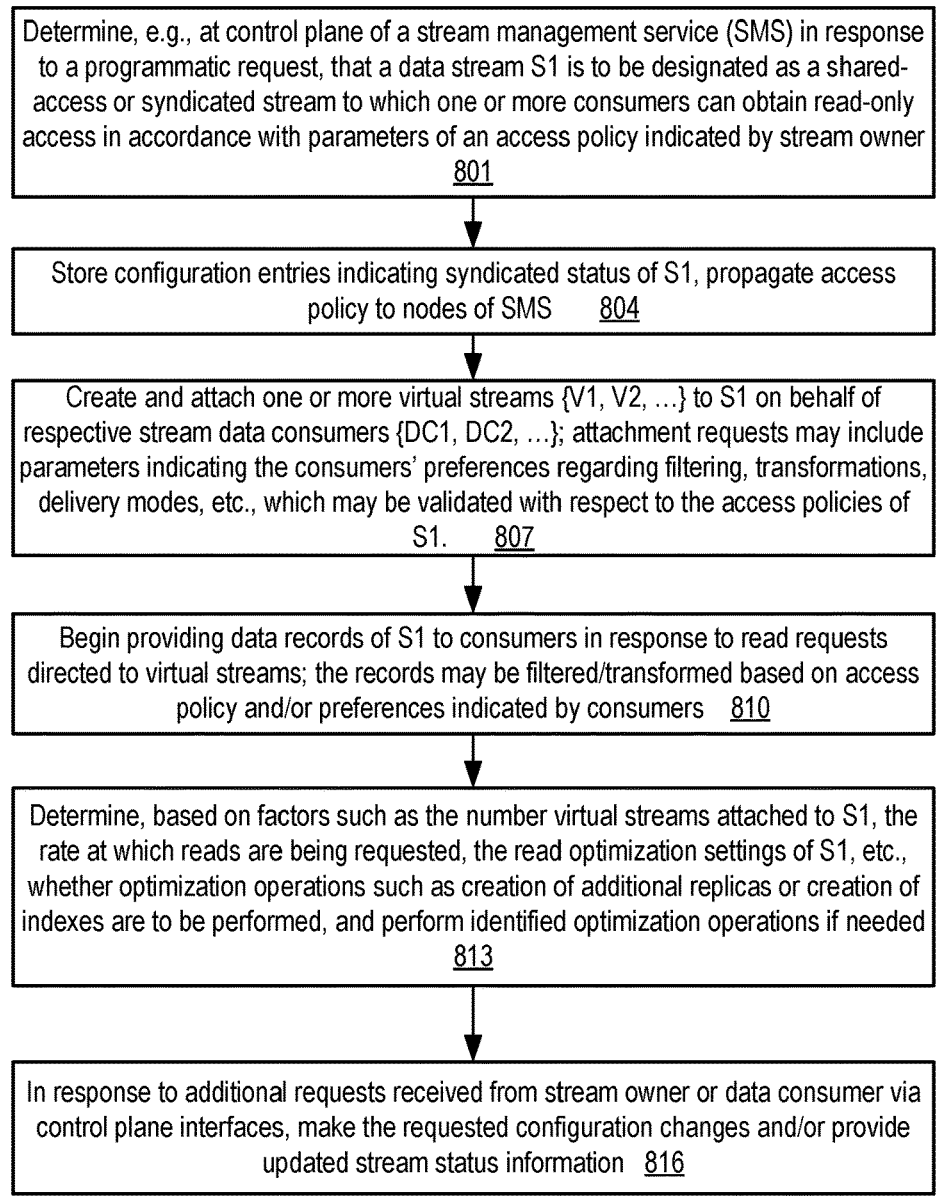
FIG. 8 is a flow diagram illustrating aspects of operations that may be performed to support managed access to syndicated data streams, according to at least some embodiments.

FIG. 8 is a flow diagram illustrating aspects of operations that may be performed to support managed access to syndicated data streams, according to at least some embodiments. As shown in element 801, a determination may be made, e.g., at a control plane of a stream management service (SMS) in response to a programmatic request, that a data stream S1 is to be designated as a shared-access or syndicated stream, such that one or more consumers can obtain read-only access to at least a portion of the contents of the stream in accordance with parameters of an access policy indicated by stream owner. In some cases a stream may be designated as shared-access or syndicated at the time the stream is created, while in other cases an un-syndicated pre-existing stream may be converted to a syndicated stream. In the depicted embodiment, a change from an un-syndicated to a syndicated mode of operation may cause a change in the manner in which the contents of the stream are to be read by at least some stream consumers, and may cause one or more configuration metadata entries to be generated by the SMS control plane. Changes with respect to the way that data records of the stream are stored may not be required when an un-syndicated stream is converted to a syndicated stream in various embodiments, but may be performed if read-optimizing operations are determined to be advisable as discussed below.

The configuration metadata indicating the syndicated mode of operation for the stream S1 may be stored, e.g., in a configuration database managed by the SMS control plane (element 804) in the depicted embodiment. In some embodiments, the access policy, which may indicate for example the identifiers of various clients which are to be permitted to read contents of the stream, filtering policies for data records, transformation policies and the like as discussed earlier, may be provided to nodes of a retrieval subsystem and/or other subsystems of the SMS.

Respective virtual streams {V1, V2, . . . ,} established on behalf of various data consumers {DC1, DC2, . . . } may be programmatically attached or associated with the syndicated stream S1 by the SMS control plane, e.g., in response to respective programmatic requests (element 807) in the depicted embodiment. In one embodiment, the virtual streams may be created using a first programmatic request, and then attached to a specified syndicated stream in a separate step, as indicated in FIG. 7. A given virtual stream may be detached from a syndicated stream and re-attached to a different syndicated stream (or the same syndicated stream to which it was attached earlier) in various embodiments. An attach request may include parameters (such as the attachParams parameter discussed in the context of FIG. 7) which indicate the consumer's preferences regarding filtering, transformations, delivery modes and the like for a given attach session in one embodiment. The retrieval subsystem of the SMS may be responsible in such an embodiments for verifying the compatibility of the consumer's preferences with the access policy indicated by the owner of the syndicated stream. In some cases, an attach request may be rejected if an incompatibility is detected. For example, an access policy may indicate that out of three categories of stream records indicated by respective tags T1, T2 and T3 in a syndicated stream S1, only records with tag T2 are to be provided to a particular data consumer DC1. If, in an attach request for a virtual stream V1, DC1 indicates that records with tag T3 are also to be provided to DC1, the attach request may be rejected by the SMS in one embodiment. Similarly, in one implementation, if a consumer indicates a preference for a "push" delivery mode for stream records in an attach request, but the access policy only allows "pull" delivery mode, a response to the attach request may indicate that the requested delivery mode cannot be supported and that the attach request has therefore been rejected. In some embodiments, as discussed earlier, information about the syndicated data streams to which virtual streams can be attached may be provided to SMS clients, e.g., in response to respective programmatic discovery requests. In some embodiments, a request to attach a virtual stream to a currently un-syndicated stream may trigger a workflow which may potentially result in the configuration of the un-syndicated stream as a syndicated stream. For example, the stream owner may set a configuration parameter convert ToSyndicatedOnAttachRequest, indicating that if an attach request is received from a client (from a list of authorized clients which may have been indicated by the stream owner), the stream may be converted to a syndicated stream.

The SMS may being providing contents data records of S1 to the data consumers, e.g., in response to read requests submitted to the attached virtual streams. The records may be filtered (e.g., only a subset of the data records may be selected for a given data consumer DC1) and/or transformed (e.g., using encryption, compression, translation, projection and the like) based on the access policies applicable to S1 and/or the data consumer's attachment parameters or preferences in various embodiments (element 810).

Based on factors such as the total number of virtual streams attached to S1, the rate at which reads are being requested, and the read-optimization policies in effect, the SMS may at various points in time identify one or more optimization operations to be performed to sustain targeted quality of service levels for the data consumers in the depicted embodiment (element 813). Such operations may include, for example, creating additional replicas of at least some of the data records of S1, creating indexes on the data records (e.g., based on attributes which are used to filter the data records for various consumers), and so on. In one embodiment, instead of replicating all the data records, only a subset which match filtering criteria corresponding to one or more consumers may be replicated for read optimization purposes. As mentioned earlier, in at least some embodiments, data records may be replicated for other reasons as well, e.g., to comply with desired persistence, availability or data durability policies. In some such embodiments, the replication for syndication-related read optimization may be performed after the corresponding data record write is committed—e.g., in one embodiment the copies needed for data durability may be made before the commit, and then any additional copies to support performance needs which cannot be met by the data durability-related copies alone may be created.

As discussed earlier in the context of FIG. 5 and FIG. 7, a number of programmatic interfaces may be supported for various configuration change requests and/or status update requests in different embodiments. In response to such requests, the SMS may perform the requested configuration changes and provide the updated status information in the depicted embodiment (element 816). All the different kinds of streams supported (default or non-syndicated, syndicated, and virtual streams) may be treated as first-class objects in various embodiments. For example, in response to a list-Streams or analogous request, data consumers may be provided information on their virtual streams, and their status with respect to attachment, just as other SMS clients may be provided status information on non-syndicated streams.

It is noted that in various embodiments, some of the operations shown in FIG. 8 may be implemented in a different order than that shown in the figure, or may be performed in parallel rather than sequentially. Additionally, some of the operations shown in FIG. 8 not be required in one or more implementations.

Chained Syndicated and Virtual Streams

Figure 9:
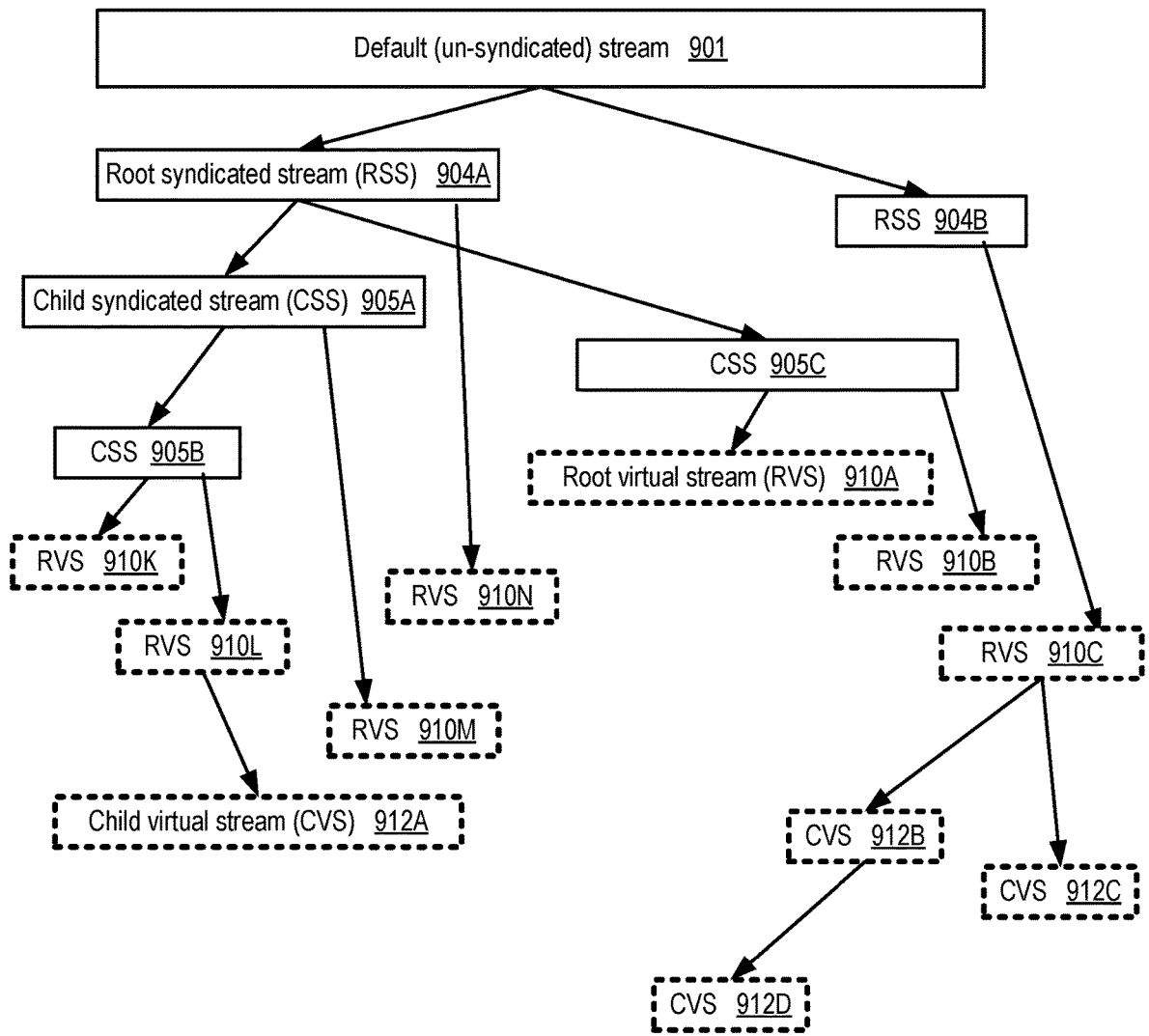
FIG. 9 illustrates examples of chained syndicated streams and chained virtual streams, according to at least some embodiments.

In some embodiments, multiple syndicated streams arranged in a parent-child hierarchy or "chain" may be established from a single default stream, with respective chaining policies indicating the subset of records of a parent syndicated stream which can be accessed via a child syndicated stream. In at least one embodiment, virtual streams may also or instead be chainable, such that at least a subset of the data records accessible via a parent virtual stream may be accessible in a policy-driven manner via read requests directed to a child virtual data stream associated with the parent virtual stream. FIG. 9 illustrates examples of chained syndicated streams and chained virtual streams, according to at least some embodiments.

In the depicted example scenario, two syndicated data streams 904A and 904B, referred to as "root" syndicated streams (RSSs), may be established from a particular default un-syndicated stream 901. In some cases, different subsets of the data records of the default stream 901 may be accessible via the respective RSSs 904—e.g., filtering rules may be specified programmatically indicating which portions of the default stream 901 are visible via the RSSs. In some embodiments, geographical considerations may be taken into account when creating chained streams—e.g., a respective RSS may be created in Europe, North America and Asia from a single default stream. The RSSs 904 may be considered roots of respective trees of zero or more child syndicated streams (CSSs) in the depicted embodiment. For example, CSS 905A has RSS 904A as its parent, CSS 905B has CSS 905A as its parent, and CSS 905C has RSS 904A as its parent. The set of data records accessible via a given CSS may represent a subset (or all) of the data records accessible from its parent syndicated stream in the depicted embodiment, depending on filtering rules indicated in the definition of the CSS. For example, the set of records which can be read from CSS 905A may form a superset of the set of records which can be read from CSS 905B via one or more virtual streams.

Corresponding to a given syndicated stream, a tree of virtual streams may be configured in the depicted embodiment. For example, root virtual streams (RVS) 910K and 910L may be attached to CSS 905B, and child virtual stream (CVS) 912A may be associated with RVS 910L. Similarly, RVS 910M may be attached to CSS 905A, RVS 910N may be attached to RSS 904A, RVS 910A and RVS 910B may be attached to CSS 905C, and RVS 910C may be attached to RSS 904B. CVS 912B and CVS 912C may be established as children of RVS 910C, while CVS 912C may be established as a child of CVS 912B. A given CVS may provide access to a subset (or all) of the content which can be read from its parent virtual stream in the depicted embodiment, e.g., based on filtering rules specified programmatically. In some cases, in addition to or instead of applying filtering rules when creating a child syndicated stream or a child virtual stream, transformation rules may be applied—e.g., the records of a child stream may comprise transformed versions of a subset of the records of a parent stream. Respective access policies may be applied at different streams along a chain of streams in some embodiments, and/or different attach preferences may be indicated for the virtual streams of a chain. A rich hierarchy of syndicated streams and attached virtual streams may thus be created in the depicted embodiment, which can be used to distribute stream contents with fine-grained precision regarding content selection, performance, geographical location and the like.

Use Cases

The techniques described above, of establishing a scalable, dynamically configurable service for collection, storage, and distribution of stream data records in a syndicated or shared-read mode may be useful in a number of scenarios. For example, large business entities may utilize thousands of hosts and other devices, collectively running a variety of applications. The applications, operating systems, and monitoring tools on the various hosts and devices may rapidly generate thousands of log records, which may need to be stored and analyzed to produce accurate business records, to determine effective provisioning plans for the data centers of the business entity, to detect security threats, and the like. As such, different subsets of the records may be of interest to respective groups of employees. Similar policy-based distribution of stream contents may be equally useful for data collected from other data producers, such as environmental or scientific sensors, social media sites, and so on. By supporting virtual streams which can be created relatively inexpensively for the various groups, and attaching the virtual streams to a syndicated stream in a policy-driven manner, the distribution of the stream contents may be managed in a flexible and efficient manner.

Illustrative Computer System

Figure 10:
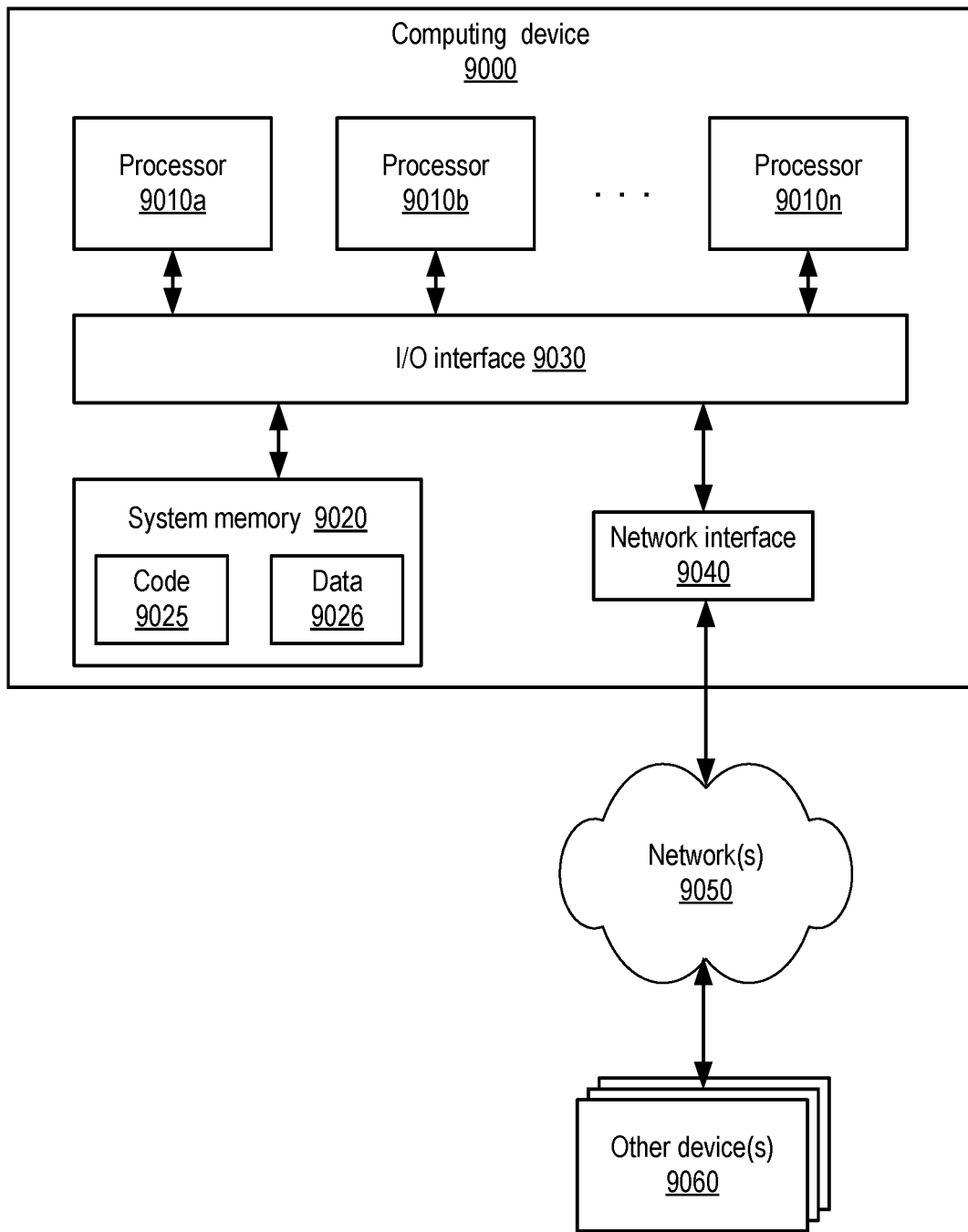
FIG. 10 is a block diagram illustrating an example computing device that may be used in at least some embodiments.

In at least some embodiments, a server that implements one or more of the techniques described above for managing and using data streams, including nodes of the control plane, ingestion subsystem, storage subsystem, or retrieval subsystem of a stream management service, as well as stream data producers and consumers, may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a data stream management service of a provider network;
wherein the one or more computing devices include instructions that upon execution on a processor cause the one or more computing devices to:
perform one or more operations to configure a first data stream as a shared-access data stream comprising a sequence of data records, wherein the configuration allows a plurality of stream consumers to obtain read-only access to the same shared-access data stream in accordance with an access policy indicated by an owner of the first data stream, and wherein the access policy comprises identification information of the plurality of stream consumers;
implement, based at least in part on a number of the plurality of stream consumers associated with the shared-access data stream, one or more read-optimizing operations, wherein a first read-optimizing operation of the one or more read-optimizing operations comprises storing respective replicas of at least a subset of the data records of the shared-access data stream at a plurality of storage devices;
provide, via a programmatic interface, a first and second status of a respective first and second virtual data stream to a respective first and second stream consumer of the plurality of stream consumers, wherein the first and second status indicates that the respective first and second virtual data streams have been established on behalf of the respective first and second stream consumers, wherein accesses to the first virtual data stream by the first stream consumer enables the first stream consumer access to one or more subsets of the data records of the shared-access data stream, including the subset of the data records, according to filtering rules of the access policy, and wherein accesses to the second virtual data stream by the second stream consumer enables the second stream consumer access to a different one or more subsets of the data records of the same shared-access data stream;
in response to a read request of the first stream consumer, wherein the read request is directed to the first virtual data stream, provide at least a portion of contents of a particular record of the subset of the data records of the shared-access data stream obtained from a particular storage device of the plurality of storage devices; and
in response to a second read request of the second stream consumer, wherein the second read request is directed to the second virtual data stream, provide at least a portion of contents of a second particular record of the different one or more subsets of the data records of the same shared-access data stream.

2. The system as recited in claim 1, wherein the instructions upon execution on the processor cause the one or more computing devices to:
receive, via another programmatic interface, a first request to configure the first data stream as a shared-access stream, wherein the one or more operations to configure the first data stream are performed in response to the first request.

3. The system as recited in claim 1, wherein the instructions upon execution on the processor cause the one or more computing devices to:
in response to a first request to establish the first virtual data stream, store configuration information indicating that the first virtual data stream is associated with the first stream consumer.

4. The system as recited in claim 1, wherein the access policy comprises an indication of one or more attributes of the data records of the shared-access data stream, wherein at least one attribute of the one or more attributes is to be used to determine whether another record of the shared-access data stream is to be provided to the first stream consumer.

5. The system as recited in claim 1, wherein individual records of the sequence of data records of the shared-access data stream comprise a data payload portion, wherein the access policy comprises an indication that, in order to determine whether another record of the shared-access data stream is to be provided to the first stream consumer, the data payload portion of the other record is to be examined.

6. A method, comprising:
performing, by one or more computing devices:
storing configuration information corresponding to a shared-access data stream, comprising a sequence of data records, established on behalf of a first stream owner, wherein the configuration information indicates that a plurality of stream consumers are granted read-only access to the same shared-access data stream;

establishing, in response to one or more configuration requests received from a first and second stream consumer of the plurality of stream consumers, a respective first and second virtual data stream associated with the shared-access data stream for the respective first and second stream consumer, wherein accesses to the first virtual data stream enables the first stream consumer read-only access to one or more particular subsets of the data records of the shared-access data stream according to one or more filtering rules, and wherein accesses to the second virtual data stream enables the second stream consumer read-only access to a different one or more subsets of the data records of the same shared-access data stream;

in response to a read request of the first stream consumer, wherein the read request is directed to the first virtual data stream, provide contents of a particular record of the one or more particular subsets of the data records of the shared-access data stream; and in response to a second read request of the second stream consumer, wherein the second read request is directed to the second virtual data stream, provide contents of a second particular record of the different one or more subsets of the data records of the same shared-access data stream.

7. The method as recited in claim 6, further comprising performing, by the one or more computing devices:

identifying one or more read-optimizing operations to be implemented with respect to the shared-access data stream.

8. The method as recited in claim 7, wherein a first read-optimizing operation of the one or more read-optimizing operations comprises storing respective replicas of at least a subset of the data records of the shared-access data stream at a plurality of storage devices.

9. The method as recited in claim 7, wherein a first read-optimizing operation of the one or more read-optimizing operations comprises generating an index on the data records of the shared-access stream.

10. The method as recited in claim 7, wherein said identifying is based at least in part on a number of stream consumers to which the read-only access is granted.

11. The method as recited in claim 6, further comprising performing, by the one or more computing devices:

determining one or more parameters of a filtering operation, based at least in part on the one or more filtering rules, to be performed to determine whether another record of the shared-access data stream is to be provided to the first stream consumer.

12. The method as recited in claim 11, wherein the one or more parameters are indicated in a message received from the stream owner via another programmatic interface.

13. The method as recited in claim 11, wherein the one or more parameters are indicated in a message received from the first stream consumer via another programmatic interface.

14. The method as recited in claim 11, wherein a first parameter of the one or more parameters indicates one or more of: (a) a tag associated with the one or more particular subsets of the data records, wherein the tag is generated by one or more stream record producers, or (b) a partitioning attribute associated with the one or more particular subsets of the data records.

15. The method as recited in claim 6, further comprising performing, by the one or more computing devices:

in response to a first programmatic request, pausing delivery of the data records of the first shared-access data stream to the first stream consumer;

updating the status of the first virtual data stream to indicate that the delivery has been paused; and in response to a second programmatic request, resuming delivery of the data records of the first shared-access data stream to the first stream consumer.

16. A non-transitory computer-accessible storage medium storing program instructions that when executed on one or more processors cause the one or more processors to:

store configuration information corresponding to a first shared-access data stream, comprising a sequence of data records, established on behalf of a first stream owner, wherein the configuration information indicates that a plurality of stream consumers are granted read-only access to the same first shared-access data stream;

establish, in response to one or more configuration requests received from a first and second stream consumer of the plurality of stream consumers, a respective first and second virtual data stream associated with the first shared-access data stream for the respective first and second stream consumer, wherein accesses to the first virtual data stream enables the first stream consumer read-only access to one or more particular subsets of the data records of the first shared-access data stream according to one or more filtering rules, and wherein accesses to the second virtual data stream enables the second stream consumer read-only access to a different one or more subsets of the data records of the same first shared-access data stream;

in response to a read request of the first stream consumer, wherein the read request is directed to the first virtual data stream, provide contents of a particular record of the one or more particular subsets of the data records of the first shared-access data stream; and in response to a second read request of the second stream consumer, wherein the second read request is directed to the second virtual data stream, provide contents of a second particular record of the different one or more subsets of the data records of the same first shared-access data stream.

17. The non-transitory computer-accessible storage medium as recited in claim 16, wherein the instructions when executed on the one or more processors cause the one or more processors to:

identify one or more read-optimizing operations to be implemented with respect to the first shared-access data stream.

18. The non-transitory computer-accessible storage medium as recited in claim 16, wherein the instructions when executed on the one or more processors cause the one or more processors to:

determine one or more parameters of a filtering operation, based at least in part on the one or more filtering rules, to be performed to determine whether another record of the first shared-access data stream is to be provided to the first stream consumer.

19. The non-transitory computer-accessible storage medium as recited in claim 18, wherein a first parameter of the one or more parameters indicates one or more of: (a) a tag associated with the subset, wherein the tag is generated by one or more stream record producers, or (b) a partitioning attribute associated with the subset.

20. The non-transitory computer-accessible storage medium as recited in claim 16, wherein the instructions when executed on the one or more processors cause the one or more processors to:
- in response to a first programmatic request, disassociate the first virtual data stream from the shared-access data stream;
- in response to a second programmatic request, provide an indication of a second shared-access data stream;
- in response to a third programmatic request, associate the first virtual data stream with the second shared-access data stream wherein the first virtual data stream enables the first stream consumer access to one or more particular subsets of the data records of the second shared-access data stream according to one or more filtering rules corresponding to the second shared-access data stream; and
- in response to another read request of the first stream consumer, wherein the read request is directed to the first virtual data stream, provide contents of a particular record of the one or more particular subsets of the data records of the second shared-access data stream.

21. The non-transitory computer-accessible storage medium as recited in claim 16, wherein the instructions when executed on the one or more processors cause the one or more processors to:
- store additional configuration information indicating a hierarchical relationship between the first shared-access data stream and a second shared-access data stream, wherein the additional configuration information indicates that at least a subset of the data records of the first shared-access data stream are accessible via the second shared-access data stream.

22. The non-transitory computer-accessible storage medium as recited in claim 16, wherein the instructions when executed on the one or more processors cause the one or more processors to:
- store additional configuration information indicating a hierarchical relationship between the first virtual data stream and the second virtual data stream, wherein the additional configuration information indicates that at least a subset of the data records accessible via the first virtual data stream are accessible via the second virtual data stream.

23. The non-transitory computer-accessible storage medium as recited in claim 16, wherein the instructions when executed on the one or more processors cause the one or more processors to:
- in response to the second read request of the second stream consumer of the plurality of stream consumers, wherein the second read request is directed to the second virtual data stream associated with the first shared-access data stream,
- apply a transformation operation to contents of the particular record of the first shared-access data stream; and
- provide the transformed contents.

* * * * *